(12) United States Patent
Kawamori et al.

(10) Patent No.: US 9,655,149 B2
(45) Date of Patent: May 16, 2017

(54) WIRELESS COMMUNICATION CONFIGURATION METHOD, WIRELESS COMMUNICATION SYSTEM, AND RECORDING DEVICE

(71) Applicant: Seiko Epson Corporation, Tokyo (JP)

(72) Inventors: Takashi Kawamori, Shiojiri (JP); Naohiro Kaneko, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 93 days.

(21) Appl. No.: 14/833,429

(22) Filed: Aug. 24, 2015

(65) Prior Publication Data

US 2016/0080227 A1 Mar. 17, 2016

(30) Foreign Application Priority Data

Sep. 11, 2014 (JP) ................................. 2014-184761

(51) Int. Cl.
| | |
|---|---|
| *H04W 4/00* | (2009.01) |
| *H04W 76/02* | (2009.01) |
| *H04W 12/06* | (2009.01) |
| *H04L 12/24* | (2006.01) |
| *G06Q 20/32* | (2012.01) |
| *H04L 29/06* | (2006.01) |
| *H04W 84/12* | (2009.01) |

(52) U.S. Cl.
CPC ............ *H04W 76/02* (2013.01); *G06Q 20/32* (2013.01); *H04L 41/0806* (2013.01); *H04W 12/06* (2013.01); *H04L 63/083* (2013.01); *H04W 84/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,290,067 | B2 * | 10/2007 | Fukunaga | G06F 9/4411 340/12.37 |
| 9,204,367 | B2 * | 12/2015 | Sung | H04W 48/08 |
| 9,459,821 | B2 * | 10/2016 | Rajewski | G06F 3/1273 |
| 2009/0199281 | A1 | 8/2009 | Cai et al. | |

FOREIGN PATENT DOCUMENTS

| | | |
|---|---|---|
| JP | 2008-193597 A | 8/2008 |
| JP | 2011-512731 A | 4/2011 |

\* cited by examiner

*Primary Examiner* — Frank Duong
(74) *Attorney, Agent, or Firm* — Foley & Lardner LLP

(57) ABSTRACT

A recording device 10 determines if a wireless LAN adapter AD was connected when the recording device 10 turned on; and monitors if a wireless LAN adapter AD becomes connected after the recording device 10 turned on. If the wireless LAN adapter AD is connected after the recording device 10 turns on and a password was previously set, the recording device 10 enables a wireless communication function and uses the previously set password for wireless communication through the wireless LAN adapter AD. If the wireless LAN adapter AD is connected after the recording device 10 turns on and a password was not previously set, the recording device 10 automatically generates a new password and enables the wireless communication function using the automatically generated password for wireless communication through the wireless LAN adapter AD.

8 Claims, 5 Drawing Sheets

WIRELESS COMMUNICATION CONFIGURATION METHOD, WIRELESS COMMUNICATION SYSTEM, AND RECORDING DEVICE

This application claims priority under 35 U.S.C. §119 to Japanese Application No. 2014-184761, filed Sep. 11, 2014, the content of which is hereby incorporated by reference in its entirety.

BACKGROUND

1. Technical Field

The present invention relates to a wireless communication configuration method, a wireless communication system, and a recording device.

2. Related Art

Technology for providing a specific service through wireless communication is disclosed in the Japanese translation of PCT international application JP-T-2011-512731.

Electronic devices that connect to a wireless adapter with a wireless communication function, and operate as an access point to communicate wirelessly with other devices, are now common. There is a need for electronic devices that connect to an existing wireless adapter to enable the user to control turning the wireless communication function of the wireless adapter on or off appropriately using a characteristic of the existing wireless adapter.

SUMMARY

The present invention is directed to solving this problem and enable controlling turning the wireless communication function of a wireless adapter on or off using a characteristic of the wireless adapter.

A method of configuring wireless communication according to the invention includes: determining if a wireless adapter was connected when an electronic device that communicates wirelessly with a device turns on; if the wireless adapter was not connected when the device turns on, monitoring if the wireless adapter was connected after the electronic device turns on; enabling a wireless communication function if the wireless adapter was connected after the electronic device turns on and a password was previously set, and using the previously set password for wireless communication through the wireless adapter; and enabling the wireless communication function, generating a password automatically, and using the automatically generated password for wireless communication through the wireless adapter if the wireless adapter was connected after the electronic device turns on and a password was not previously set.

Thus comprised, turning a wireless communication function on and off can be controlled according to a characteristic of the wireless adapter.

In another method of configuring wireless communication according to the invention, the electronic device has a recording unit that records on a recording medium; the automatically generated password is recorded with the recording unit when a password is generated automatically.

Thus comprised, the user can easily know what the generated password is.

A method of configuring wireless communication according to another aspect of the invention also includes: enabling the wireless communication function and using the previously set password for wireless communication through the wireless adapter, if a password was previously set when the electronic device turns on with a wireless adapter already connected; and if a password was not previously set when the electronic device turns on with a wireless adapter already connected, enabling the wireless communication function if a password was generated automatically before the electronic device turned on, and using the password generated automatically before turning on for wireless communication through the wireless adapter, and disabling the wireless communication function if a password was not generated automatically before the electronic device turned on.

Thus comprised, the electronic device can execute the process of generating a password appropriately to when the wireless adapter is connected.

Another aspect of the invention is a wireless communication system including: an electronic device to which a wireless adapter with a wireless communication function connects; and a device that communicates wirelessly with the electronic device through the wireless adapter. The electronic device determines if the wireless adapter was connected when the power turns on; if the wireless adapter was not connected when the device turns on, monitors if the wireless adapter is connected after the power turns on; enables a wireless communication function if the wireless adapter was connected after the power turns on and a password was previously set, and uses the previously set password for wireless communication with the device through the wireless adapter; and enables the wireless communication function, generating a password automatically, and uses the automatically generated password for wireless communication with the device through the wireless adapter if the wireless adapter was connected after the power turns on and a password was not previously set.

Thus comprised, turning a wireless communication function on and off can be controlled according to a characteristic of the wireless adapter.

Another aspect of the invention is a recording device including: a recording unit that records on a recording medium; and a control unit that determines if a wireless adapter was connected when the power turns on, if the wireless adapter was not connected when the device turns on, monitors if the wireless adapter is connected after the power turns on, enables a wireless communication function if the wireless adapter was connected after the power turns on and a password was previously set, and uses the previously set password for wireless communication through the wireless adapter, and enables the wireless communication function, generates a password automatically, uses the automatically generated password for wireless communication through the wireless adapter, and records the automatically generated password with the recording unit if the wireless adapter was connected after the power turns on and a password was not previously set.

Thus comprised, turning a wireless communication function on and off can be controlled according to a characteristic of the wireless adapter.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 2 is a flow chart showing an operation of a recording device for selecting between a first process and a second process when the recording device is turned on.

DESCRIPTION OF EMBODIMENTS

A preferred embodiment of the present invention is described below with reference to the accompanying figures.

Figure 1:
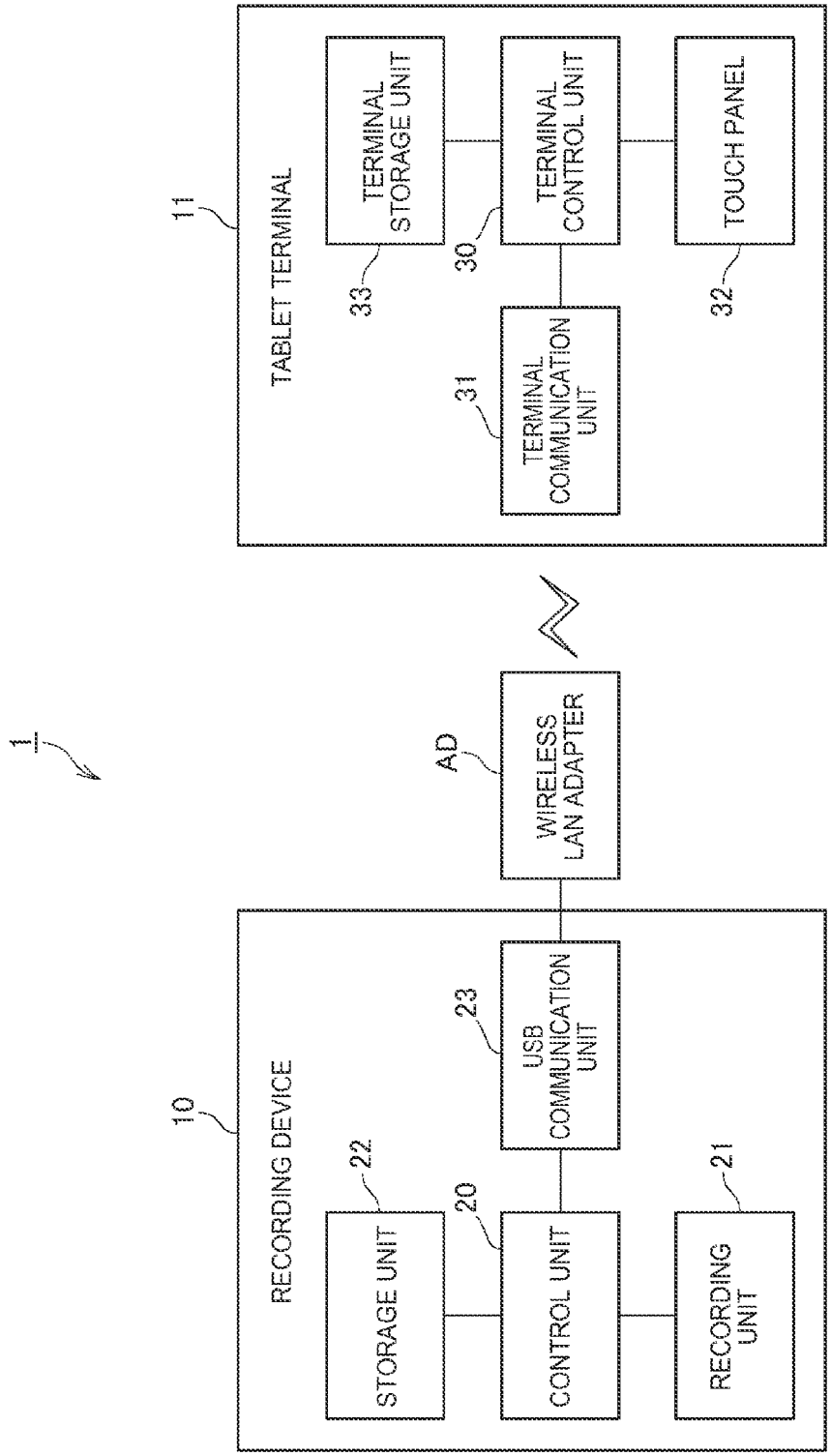
FIG. 1 illustrates a POS system according to an embodiment of the present invention.

FIG. 1 illustrates a POS (point-of-sale) system 1 according to this embodiment of the invention.

As shown in FIG. 1, the POS system 1 includes a recording device 10 (electronic device) and a tablet terminal 11 (device).

The POS system 1 is used in retail stores, restaurants, and other businesses where customer transactions are processed. In a store, for example, a checkout counter is installed where sales transactions are processed, and a recording device 10 and tablet terminal 11 are installed at the checkout counter.

The recording device 10 in this embodiment is a thermal printer that records images on roll paper with a thermal head. The recording device 10 has a function for conveying stored roll paper through a conveyance path, a function for recording images on the roll paper, and a function for cutting the roll paper, and issues tickets on which specific images are recorded.

The tablet terminal 11 is a tablet computer having a touch panel 32 on the front. A POS application is installed on the tablet terminal 11. A printer driver for controlling the recording device 10 is also installed on the tablet terminal 11. As described further below, the tablet terminal 11 controls the recording device 10 and produces receipts using the recording device 10 by means of functions of the POS application and the printer driver when processing a transaction.

As shown in FIG. 1, the recording device 10 includes a control unit 20, a recording unit 21, a storage unit 22, and a USB communication unit 23.

The control unit 20 includes a CPU, ROM, RAM, and other peripheral circuits, and controls the recording device 10.

The recording unit 21 has various mechanisms related to recording on roll paper, including a conveyance mechanism for conveying roll paper stored inside a cabinet of the recording device 10, a recording mechanism for recording (or printing) images such as by forming dots on the roll paper with a thermal head, and a cutting mechanism for cutting the roll paper at a specific position. The recording unit 21 records images related to a transaction (e.g. sales transaction) on the roll paper by means of the recording mechanism while conveying the roll paper with the conveyance mechanism, and cuts the roll paper at a specific position by means of the cutting mechanism to produce a receipt, as controlled by the control unit 20.

The storage unit 22 includes nonvolatile memory and stores data.

The USB communication unit 23 includes an interface board with a physical port conforming to the USB (Universal Serial Bus) standard, and when a USB device is connected, handles communication with the USB device according to the USB protocol.

A wireless LAN adapter AD (wireless adapter) can connect as a USB device to the recording device 10.

The wireless LAN adapter AD is an external adapter with the ability to communicate wirelessly (a wireless communication function) according to a specific wireless communication standard for a wireless LAN.

A specific operating system (OS) is also installed on the recording device 10. This specific OS also has a SoftAP (software-enabled access point) function. A device driver for controlling the wireless LAN adapter AD is also installed on the recording device 10.

When the wireless LAN adapter AD is connected, the SoftAP function of the specific OS and the functions of the device driver enable the recording device 10 to operate as a wireless LAN access point and communicate wirelessly with other devices according to the specific wireless communication standard used on the wireless LAN.

As shown in FIG. 1, the tablet terminal 11 includes a terminal control unit 30, a terminal communication unit 31, a touch panel 32, and a terminal storage unit 33.

The terminal control unit 30 includes a CPU, ROM, RAM, and other peripheral circuits, and controls the tablet terminal 11.

The terminal communication unit 31 communicates wirelessly with the recording device 10 according to a specific wireless communication protocol as controlled by the terminal control unit 30.

The touch panel 32 includes a display panel such as a liquid crystal display panel, and a touch sensor disposed over the LCD display panel. The display panel displays images as controlled by the terminal control unit 30. The touch sensor detects touch operations by the user, and outputs these operations to the terminal control unit 30.

The terminal storage unit 33 is nonvolatile memory and stores data.

When setting up the POS system 1 in the store, the recording device 10 and the tablet terminal 11 must be enabled to communicate wirelessly.

The job of configuring wireless communication between the recording device 10 and tablet terminal 11 is typically complicated, and there is a need to make the task easier.

More particularly in a small business having a POS system 1 with one recording device 10 and one tablet terminal 11, there is a need to simplify the task of configuring an environment enabling the devices to communicate wirelessly, and to reduce the cost as much as possible when building the POS system 1.

The recording device 10 therefore executes the process described below when enabling wireless communication between the recording device 10 and tablet terminal 11.

Figure 2:
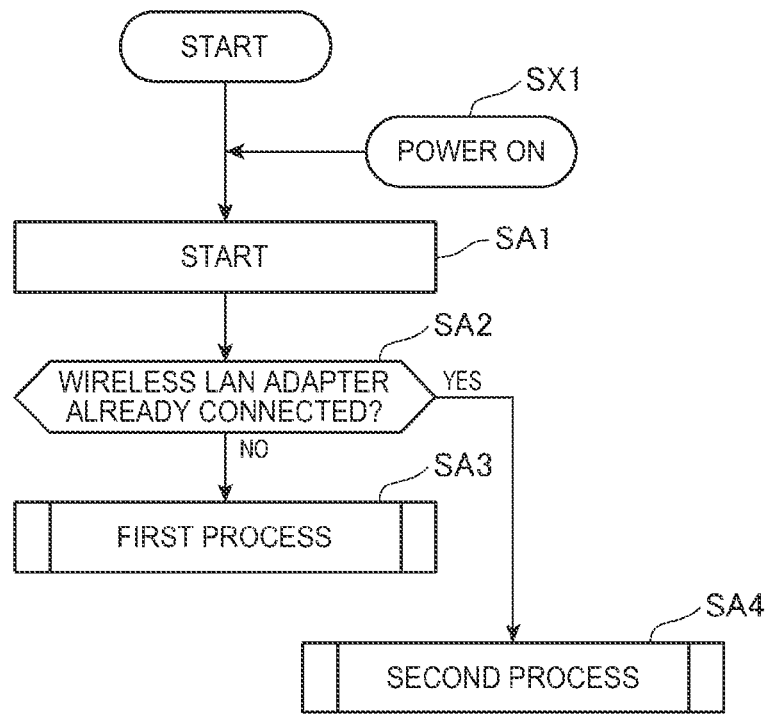

FIG. 2 is a flow chart showing the operation of the recording device 10 to open a wireless communication path (i.e. link) between the recording device 10 and tablet terminal 11 after the recording device 10 turns on.

As shown in FIG. 2, when the power turns on (step SX1), the OS of the recording device 10 starts, and firmware or software that runs on the OS starts (step SA1).

The control unit 20 of the recording device 10 then determines if the wireless LAN adapter AD is connected, or more specifically, if the recording device 10 power turned on with the wireless LAN adapter AD already connected (step SA2).

If the recording device 10 power turned on with the wireless LAN adapter AD not connected (step SA2 returns NO), the control unit 20 executes a first process (step SA3). However, if the recording device 10 power turned on with the wireless LAN adapter AD connected (step SA2 returns YES), the control unit 20 executes a second process (step SA4).

Figure 3:
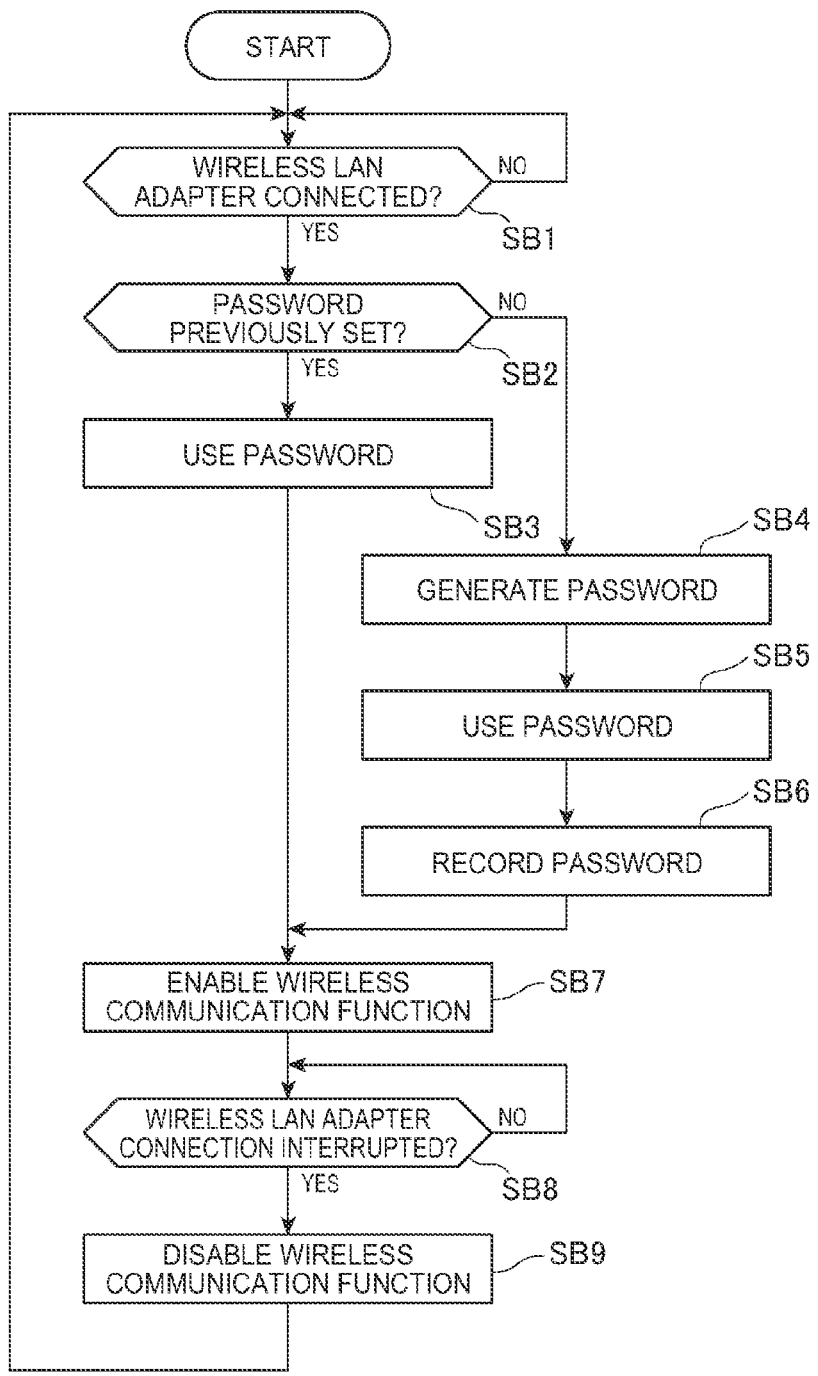
FIG. 3 is a flow chart describing the first process of the flow chart of FIG. 2.

FIG. 3 is a flow chart describing the first process in detail.

In the first process, the control unit 20 checks if the wireless LAN adapter AD was connected (step SB1).

If a wireless LAN adapter AD was connected (step SB1 returns YES), the control unit 20 continues from step SB2. In step SB2, the control unit 20 determines if the password (also known as an encryption key or pass phrase) used for wireless communication through the wireless LAN adapter AD was previously set by the user.

Note that "password" as used below denotes the password used for wireless communication through the wireless LAN adapter AD.

The user can set the password used for wireless communication through the wireless LAN adapter AD by using a user interface provided by the operating system or associated program. When the user sets the password, the password that was set is stored to relationally to information indicating that the user set the password ("user setting identification information" below) in a specific configuration file stored in the storage unit 22. In step SB2, the control unit 20 determines if a password was previously set by the user by referencing the configuration file and determining if a password related to the user setting identification information is in the configuration file.

If a password was previously registered (step SB2 returns YES), the control unit 20 uses the previously set password as the password for wireless communication through the wireless LAN adapter AD (step SB3). Next, the control unit 20 goes to step SB7.

If a password was not previously set (step SB2 returns NO), the control unit 20 (automatically) generates a password (step SB4). The control unit 20 creates the password by a function of a specific algorithm for generating passwords.

In step SB4, the control unit 20 stores the generated password relationally to information identifying the generated password as an automatically generated password ("automatic setting identification information") in the configuration file. If a password related to the automatic setting identification information is already stored in the configuration file, that password is overwritten by the password generated in step SB4.

Next, the control unit 20 sets the password generated in step SB4 as the password to use for wireless communication through the wireless LAN adapter AD (step SB5).

Next, the control unit 20 controls the recording unit 21 to produce a ticket recording the password generated in step SB4 (step SB6). Next, the control unit 20 goes to step SB7.

The recording device 10 thus generates a password automatically if a password was not previously set, and produces (e.g. prints, displays or otherwise outputs) a ticket on which the generated password is printed. As a result, the user can know that a password was generated automatically, and can know what the generated password is, by reading the ticket.

In step SB7, the control unit 20 enables the wireless communication function of the wireless LAN adapter AD.

More specifically, the control unit 20 enables the SoftAP function of the operating system, enables functions of the device driver of the wireless LAN adapter AD and other associated programs, makes required initialization settings, and enables wireless communication with other devices as client devices.

The tablet terminal 11 can then communicate wirelessly with the recording device 10 by means of wireless communication through the wireless LAN adapter AD. More specifically, the user inputs the SSID of the recording device 10 operating as an access point, and the password used for wireless communication, to a specific user interface provided by the tablet terminal 11. The user already knows the SSID of the wireless LAN adapter AD. Based on the input SSID and password, the storage unit 22 accesses the wireless LAN adapter AD. In response to the tablet terminal 11 accessing the wireless LAN adapter AD, the IP address, subnet mask, default gateway address (the address of the wireless LAN adapter AD in this example) are set in the tablet terminal 11 by the DHCP (Dynamic Host Configuration Protocol) function of the recording device 10. Based on these settings, the tablet terminal 11 connects wirelessly to the wireless LAN adapter AD.

After enabling the wireless communication function of the wireless LAN adapter AD, the control unit 20 monitors if the wireless LAN adapter AD connection is cancelled (e.g. interrupted) (step SB8).

If the connection is cancelled (step SB8 returns YES), the control unit 20 disables the wireless communication function of the wireless LAN adapter AD (step SB9). In step SB9, the control unit 20 disables at least the SoftAP function of the operating system so that wireless communication with devices through the wireless LAN adapter AD is not possible. Next, the control unit 20 returns to step SB1, and again monitors if a wireless LAN adapter AD is connected.

As described in this example, if the user turns the recording device 10 on without the wireless LAN adapter AD connected and then connects the wireless LAN adapter AD to the recording device 10, the wireless communication function of the wireless LAN adapter AD is automatically enabled. As a result, one can easily wirelessly connect the tablet terminal 11 to the recording device 10.

The user may also want to change the password during wireless communication using a password that was set automatically. The wireless communication settings on the tablet terminal 11 may also be reset for some reason, requiring inputting the password again, but the ticket printed with the password may have already been discarded. In this event, the user can simply temporarily disconnect the connected wireless LAN adapter AD, and then connect the wireless LAN adapter AD again. This causes a new password to be automatically generated again, and a new ticket recording the newly generated password to be issued. The user can then refer to the new ticket to input the SSID and password to the tablet terminal 11, and thereby wirelessly connect the recording device 10 and tablet terminal 11.

Figure 4:
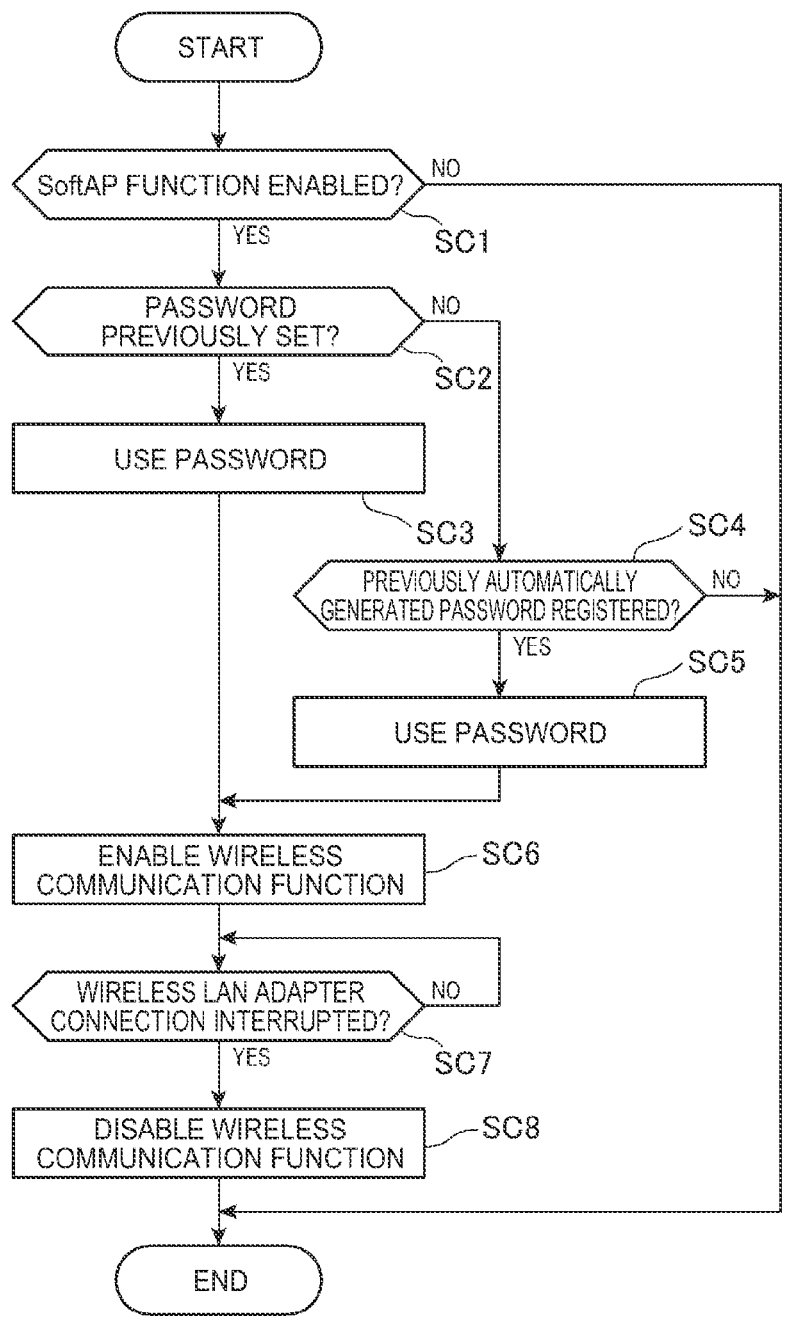
FIG. 4 is a flow chart describing the second process of the flow chart of FIG. 2.

FIG. 4 is a flow chart describing the second process executed in step SA4 in FIG. 2.

As described in FIG. 2, the second process is a process executed when the recording device 10 is turned on with the wireless LAN adapter AD already connected.

As shown in FIG. 4, the control unit 20 determines if the SoftAP function of the operating system is enabled (step SC1). The SoftAP function can be previously turned on or off by the user. The user enables the SoftAP function to allow wireless communication, and disables the SoftAP function to prohibit wireless communication, through the wireless LAN adapter AD.

If the SoftAP function is not enabled (step SC1 returns NO), the control unit 20 ends the second process. In this event, the wireless communication function of the wireless LAN adapter AD is not enabled, and the tablet terminal 11 cannot connect wirelessly to the recording device 10. In other words, the control unit 20 disables wireless communication by ending the second process.

If the SoftAP function is enabled (step SC1 returns YES), the control unit 20 determines if the user previously set a password (step SC2).

If the user previously set the password (step SC2 returns YES), the control unit 20 uses the previously set password as the password for wireless communication through the wireless LAN adapter AD (step SC3). Next, the control unit 20 goes to step SC6. In step SC6, the control unit 20 enables the wireless communication function of the wireless LAN adapter AD.

If a password was not previously set by the user (step SC2 returns NO), the control unit 20 determines if a password was generated automatically before the recording device 10 was turned on in step SA1 in FIG. 2 (step SC4).

As described above, if the wireless LAN adapter AD is connected after the recording device 10 turns on, and a password was not previously set by the user, a password is generated automatically. The automatically generated password is then stored in a configuration file relationally to automatic setting identification information. If a password is recorded relationally to the automatic setting identification information in the configuration file, the control unit 20 determines in step SC4 that a password was set automatically before the recording device 10 was turned on in step SA1 in FIG. 2.

In other words, if in the past the wireless LAN adapter AD was connected after the recording device 10 turned on without a password having been previously set, and a password is generated automatically in conjunction with connection of the wireless LAN adapter AD, the control unit 20 determines in step SC4 that there is an automatically generated password.

If there is a password that was set automatically before the recording device 10 turns on in step SA1 in FIG. 2 (step SC4 returns YES), the control unit 20 sets that password as the password to use for wireless communication through the wireless LAN adapter AD (step SC5). Next, the control unit 20 goes to step SC6. In step SC6, the control unit 20 enables the wireless communication function of the wireless LAN adapter AD.

However, if there is not a password that was set automatically before the recording device 10 turns on in step SA1 in FIG. 2 (step SC4 returns NO), the control unit 20 ends the second process. In this event, the wireless communication function of the wireless LAN adapter AD is not enabled, and the tablet terminal 11 cannot communicate wirelessly with the recording device 10. In other words, the control unit 20 disables wireless communication by ending the second process.

The control unit 20 thus disables the wireless communication function when the recording device 10 is turned on with a wireless LAN adapter AD already connected, a password has not been set by the user, and a password was not previously generated automatically. More specifically, the control unit 20 does not automatically generate a password when the recording device 10 is turned on with a wireless LAN adapter AD already connected. The processes executed by the control unit 20 are therefore different when the power turns on with the wireless LAN adapter AD already connected, and when the wireless LAN adapter AD is connected after the power turns on. The reason why the control unit 20 executes the above processes is described below.

After the POS system 1 is deployed in a store, the wireless LAN adapter AD may remain continuously connected to the recording device 10. For example, the wireless LAN adapter AD could be connected and disconnected each time the recording device 10 is turned on and off at the start and close of business each day, but this is cumbersome and creates the risk of losing the wireless LAN adapter AD.

Furthermore, when the recording device 10 is turned on with the wireless LAN adapter AD already connected, but a password was not previously set by the user and a password was not previously generated automatically, not generating a password has the following effect. Specifically, when the user wants to use the user-defined password for wireless communication between devices through the wireless LAN adapter AD, a password can be prevented from being generated automatically against the intention of the user when the recording device 10 turns on at the start of business. Note that if the user wants to use the password generated automatically by the recording device 10, the user can simply and intentionally disconnect and reconnect the wireless LAN adapter AD after turning the recording device 10 on.

After enabling wireless communication through the wireless LAN adapter AD in step SC6, the control unit 20 monitors if the wireless LAN adapter AD connection is interrupted (step SC7).

If the connection is interrupted (step SC7 returns YES), the control unit 20 disables the wireless communication function of the wireless LAN adapter AD (step SC8), and ends the second process.

Note that after the wireless LAN adapter AD connection is interrupted, the control unit 20 executes the first process described in FIG. 3.

In this embodiment of the invention, the user can establish a wireless communication connection between a recording device 10 and a tablet terminal 11 by the simple tasks of connecting a wireless LAN adapter AD to the recording device 10, and setting a password as necessary by referring to a ticket printed by the recording device 10. There is, therefore, no need to use an access point or wireless LAN router to deploy a wireless LAN, and the user's job is simple.

The user also only needs a wireless LAN adapter AD and common tablet terminal 11 in addition to the recording device 10 to build a POS system 1, and the cost of deploying a POS system 1 can be reduced.

The operation of the recording device 10 and tablet terminal 11 during a sale transaction is described next.

Figure 5:
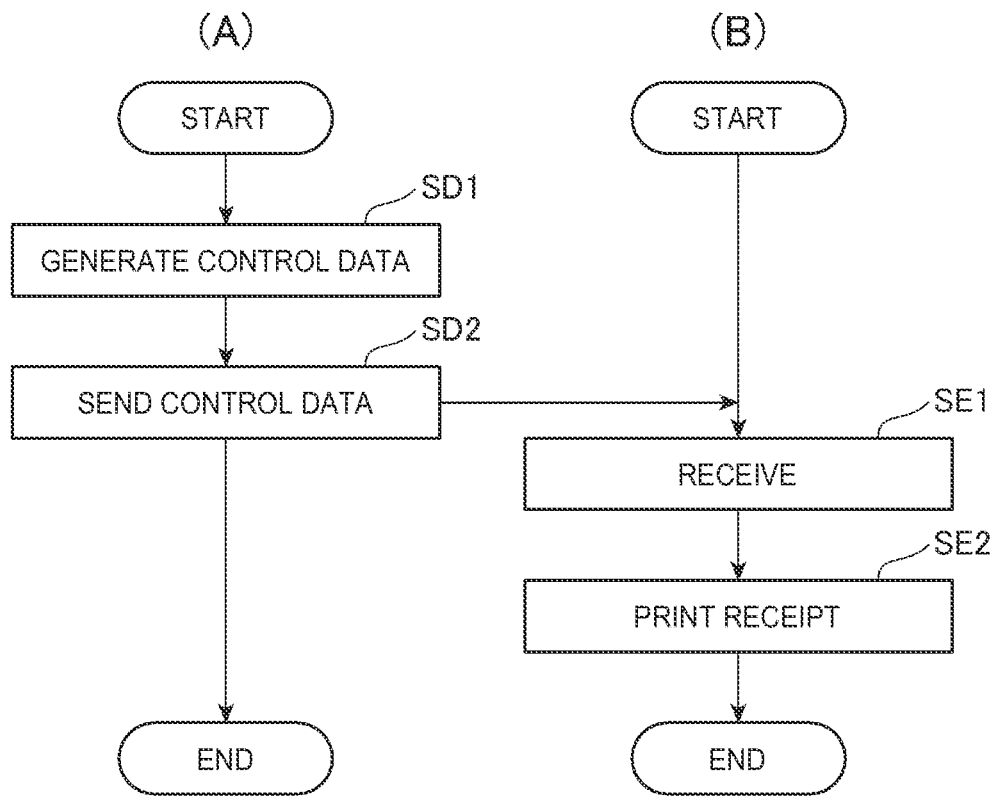
FIG. 5 is a flow chart showing the operation of the recording device and tablet terminal during a sales transaction.

FIG. 5 is a flow chart of the operation of the recording device 10 and tablet terminal 11 during a transaction, (A) showing the operation of the tablet terminal 11, and (B) showing the operation of the recording device 10.

Note that when the process shown in FIG. 5 starts, the wireless LAN adapter AD is connected to the recording device 10, and wireless communication is enabled between the recording device 10 and tablet terminal 11 through the wireless LAN adapter AD.

As shown in FIG. 5, column (A), the terminal control unit 30 of the tablet terminal 11 executes a payment process according to the customer transaction, and generates control data based on the payment process (step SD1).

More specifically, the function blocks of the terminal control unit 30 of the tablet terminal 11 include a POS application execution unit that runs a POS application, and a printer driver execution unit that runs a printer driver.

The POS application execution unit generates receipt information including information recorded on the sales receipt according to the customer transaction. This receipt information includes information related to a logo recorded on the receipt, information identifying when the receipt was printed (date and time), information related to the name, price, quantity, and tax charged for each purchased item, the transaction total, the amount received from the customer, the amount of change due, and other desirable information. The POS application execution unit generates the receipt information based on input by the checkout clerk to a specific user interface for each transaction by a customer of the business.

After generating the receipt information, the printer driver execution unit generates control data in the command language of the recording device 10 instructing the recording device 10 to record the receipt information and produce a receipt.

The tablet terminal 11 then controls the terminal communication unit 31 to send the generated control data to the recording device 10 (step SD2).

As shown in FIG. 5, column (B), the control unit 20 of the recording device 10 controls the USB communication unit 23 to receive the control data by wireless communication through the wireless LAN adapter AD (step SE1).

Next, the control unit 20 controls the recording unit 21 based on the received control data to produce a receipt (step SE2). The resulting receipt is then given by the checkout clerk to the customer.

As described above, the recording device 10 (electronic device) in the embodiment described above has a wireless LAN adapter AD (wireless adapter) with a wireless communication function connected thereto, and can communicate wirelessly with a tablet terminal 11 (device).

The control unit 20 of the recording device 10 determines if a wireless LAN adapter AD was connected when the recording device 10 turned on, and if a wireless LAN adapter AD was not connected, disables wireless communication. The control unit 20 of the recording device 10 also monitors if an wireless LAN adapter AD is connected after the recording device 10 turns on, and if a wireless LAN adapter AD is connected after the recording device 10 turns on and a password was previously set, the control unit 20 enables wireless communication and uses the password that was previously set as for wireless communication through the wireless LAN adapter AD. If a wireless LAN adapter AD is connected after the recording device 10 turns on and a password was not previously set, the control unit 20 of the recording device 10 enables wireless communication, generates a password, and uses the generated password for wireless communication through the wireless LAN adapter AD.

Thus comprised, the user can enable or disable the wireless communication function by the simple task of connecting the wireless LAN adapter AD after turning the recording device 10 on. In other words, the wireless communication function can be enable or disabled using the ability to connect and disconnect the wireless LAN adapter AD.

The control unit 20 in this embodiment of the invention also records the generated password with the recording unit 21 when a password is generated.

As a result, when a password is generated by the recording device 10, the user can know what the generated password is by simply reading the printed information.

If the wireless LAN adapter AD was connected when the recording device turned on and a password was previously set, the control unit 20 in this embodiment of the invention enables the wireless communication function and uses the previously set password for wireless communication through the wireless adapter. If the wireless LAN adapter AD was connected when the recording device turned on and a password was not previously set, the control unit 20 in this embodiment of the invention enables the wireless communication function if a password was generated before the recording device started and uses the password generated before startup for wireless communication through the wireless LAN adapter AD, but disables the wireless communication function if a password was not generated before startup.

Thus comprised, the recording device 10 executes the process of generating a password based on the timing when the wireless LAN adapter AD was connected.

The invention is described above with reference to a preferred embodiment thereof, but the invention is not limited thereto and can be modified and adapted in many ways without departing from the scope of the accompanying claims.

For example, the printing method of the recording device 10 in the foregoing embodiment is thermal printing, but the invention is not limited to thermal printing methods.

The function blocks described above can also be desirably embodied by combinations of hardware and software, and do not suggest a specific hardware configuration.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A method of configuring wireless communication, comprising:
   determining if a wireless adapter was connected to an electronic device when the electronic device turns on, said electronic device being configured to support a wireless communication function wherein the wireless adapter is used to communicate wirelessly with a second device;
   wherein:
   if the wireless adapter was not connected when the electronic device turns on, then monitoring if the wireless adapter is newly connected after the electronic device is turned on;
   if the wireless adapter is newly connected after the electronic device is turned on and a password was previously set in the electronic device, then enabling the wireless communication function using the previously set password for wireless communication through the wireless adapter;
   else if the wireless adapter is newly connected after the electronic device is turned on and a password was not previously set in the electronic device, then automatically generating a password and enabling the wireless communication function using the automatically generated password for wireless communication through the wireless adapter.

2. The method of configuring wireless communication described in claim 1, wherein the electronic device has a recording unit that records on a recording medium, said method further including:
   recording on the recording medium the automatically generated password in response to a password being generated automatically.

3. The method of configuring wireless communication described in claim 1, further comprising:
   if a user-created password was previously set when the electronic device turns on with a wireless adapter already connected, then enabling the wireless communication function and using the previously set user-created password for wireless communication through the wireless adapter; and if a user-created password was not previously set when the electronic device turns on with a wireless adapter already connected, then determining if an automatically generated password was previously generated and stored before the electronic device was currently turned on, and if an automatically generated password was previously stored, then enabling the wireless communication function and using the previously stored automatically generated password for wireless communication through the wireless adapter, and if an automatically generated password was not previously stored, then disabling the wireless communication function.

4. A wireless communication system comprising:

an electronic device to which a wireless adapter with a wireless communication function connects; and a second device that communicates wirelessly with the electronic device through the wireless adapter;

the electronic device determining if the wireless adapter was connected when the electronic device turns on, if the wireless adapter was not connected when the electronic device turns on, then monitoring if the wireless adapter is newly connected after the power is turned on, if the wireless adapter is newly connected after the electronic device is turned on and a password was previously set in the electronic device, then enabling the wireless communication function and using the previously set password for wireless communication with the second device through the wireless adapter, and else if the wireless adapter is newly connected after the electronic device is turned on and a password was not previously set in the electronic device, then automatically generating a password and enabling the wireless communication function using the automatically generated password for wireless communication with the second device through the wireless adapter.

5. The wireless communication system described in claim 4, wherein:

the electronic device has a recording unit that records on a recording medium; and records on the recording medium the automatically generated password in response to a password being generated automatically.

6. The wireless communication system described in claim 4, wherein:

if a user-created password was previously set when the electronic device turns on with a wireless adapter already connected, then the wireless communication function is enabled and the previously set user-created password is used for wireless communication through the wireless adapter; and if a user-created password was not previously set when the electronic device turns on with a wireless adapter already connected, then determining if an automatically generated password was previously generated and stored before the electronic device was currently turned on, and if an automatically generated password was previously stored, then the wireless communication function is enabled and the previously stored automatically generated password is used for wireless communication through the wireless adapter, else the wireless communication function is disabled.

7. A recording device comprising:

a recording unit that records on a recording medium; and a control unit that determines if a wireless adapter was connected to the recording device when the recording device turns on, wherein:

if the wireless adapter was not connected when the recording device turns on, then monitoring if the wireless adapter is newly connected after the recording device is turned on, if the wireless adapter is newly connected after the recording device is turned on and a password was previously set in the recording device, then enabling a wireless communication function and using the previously set password for wireless communication through the wireless adapter, else if the wireless adapter is newly connected after the electronic device is turned on and a password was not previously set in the electronic device, then:

automatically generating a password, enabling the wireless communication function, using the automatically generated password for wireless communication through the wireless adapter, and recording the automatically generated password on the recording medium.

8. The recording device described in claim 7, wherein:

if a user-created password was previously set when the recording device turns on with a wireless adapter already connected, then the control unit enables the wireless communication function and uses the previously set user-created password for wireless communication through the wireless adapter;

if a user-created password was not previously set when the recording device turns on with a wireless adapter already connected, then determining if an automatically generated password was previously generated and stored before the recording device was currently turned on, and if an automatically generated password was previously stored, then the control unit enables the wireless communication function and uses the previously stored automatically generated password for wireless communication through the wireless adapter, else the control unit disables the wireless communication function.

* * * * *